(12) United States Patent
Branover et al.

(10) Patent No.: US 8,966,305 B2
(45) Date of Patent: Feb. 24, 2015

(54) MANAGING PROCESSOR-STATE TRANSITIONS

(75) Inventors: Alexander Branover, Chestnut Hill, MA (US); Maurice B. Steinman, Marlborough, MA (US); John P. Petry, San Diego, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 889 days.

(21) Appl. No.: 13/174,144

(22) Filed: Jun. 30, 2011

(65) Prior Publication Data

US 2013/0007494 A1 Jan. 3, 2013

(51) Int. Cl.
G06F 1/26 (2006.01)
G06F 1/32 (2006.01)

(52) U.S. Cl.
CPC .................. G06F 1/3203 (2013.01)
USPC .......................... 713/323; 713/320

(58) Field of Classification Search
USPC ................ 713/300, 320, 321, 322, 323, 324
See application file for complete search history.

(56) References Cited

U.S. PATENT DOCUMENTS

| | | | | |
|---|---|---|---|---|
| 6,457,135 | B1 * | 9/2002 | Cooper | 713/323 |
| 8,135,970 | B2 * | 3/2012 | Gaskins et al. | 713/322 |
| 2004/0255176 | A1 * | 12/2004 | George et al. | 713/320 |
| 2008/0016380 | A1 * | 1/2008 | Stufflebeam | 713/320 |
| 2009/0193274 | A1 * | 7/2009 | Cline et al. | 713/320 |
| 2009/0235105 | A1 | 9/2009 | Branover et al. | |
| 2010/0058078 | A1 | 3/2010 | Branover et al. | |
| 2010/0218015 | A1 * | 8/2010 | Yarak | 713/320 |
| 2010/0287394 | A1 | 11/2010 | Branover et al. | |
| 2011/0078478 | A1 | 3/2011 | Branover et al. | |

OTHER PUBLICATIONS

2nd Generation Intel Core Processor Family Desktop: Datasheet, vol. 1, Supporting Intel Core i7, i5 and i3 Desktop Processor Series, Intel, Jan. 2011, 110 pages.

* cited by examiner

*Primary Examiner* — Kim Huynh
*Assistant Examiner* — Paul J Yen
(74) *Attorney, Agent, or Firm* — Meyertons, Hood, Kivlin, Kowert & Goetzel, P.C.; Paul T. Seegers; Dean M. Munyon

(57) ABSTRACT

Techniques are disclosed relating to managing power consumption and latencies for entry and exit of idle power states. In one embodiment, a processor includes a processing core configured to operate in a plurality of power states (e.g., C-states) that includes an operating power state and at least one idle power state. The processing core is also configured to operate in a plurality of performance states. The processor further includes a power management unit configured to receive a request from the processing core to enter the at least one idle power state. The power management unit is configured to select a first of the plurality of performance states (e.g., P-states) based on the requested idle power state. In one embodiment, the power management unit is further configured to cause the processing core to transition into the selected first performance state prior to entering the requested idle power state.

18 Claims, 7 Drawing Sheets

MANAGING PROCESSOR-STATE TRANSITIONS

BACKGROUND

1. Technical Field

This disclosure relates generally to processors, and, more specifically, to power states and performance states of processors.

2. Description of the Related Art

Reducing power consumption is a continuing goal of processor designers. To facilitate power management, modern processors generally support multiple power and performance states that correspond to different levels of performance and power consumption. The Advanced Configuration and Power Interface (ACPI) specification, which is a standard supported by many modern processors, refers to performance states as "P-States" and power states as "C-States." The selection of performance states and power states is often determined based on performance demands and power constraints of a processor.

SUMMARY OF EMBODIMENTS

The present disclosure describes various embodiments of systems and methods relating to managing power consumption and latencies for entry and exit of idle power states.

In one embodiment, an apparatus is disclosed. The apparatus includes a processing core configured to operate in a plurality of power states that includes an operating power state and at least one idle power state. The processing core is also configured to operate in a plurality of performance states. The apparatus further includes a power management unit configured to receive a request from the processing core to enter the at least one idle power state, and to select a first of the plurality of performance states based on the requested idle power state. The apparatus is configured to cause the processing core to transition into the selected first performance state prior to entering the requested idle power state.

In another embodiment, a method is disclosed. The method includes a processor operating a processing core at a first performance state when the processing core enters an idle power state. The method further includes the processor selecting a second performance state for the processing core while in the idle power state. The method further includes the processor operating the processing core at the second performance state when the processing core exits the idle power state.

In still another, a computer readable storage medium is disclosed. The storage medium stores a data structure, which is operated upon by a program executable on a computer system. The program operating on the data structure is executable to perform a portion of a process to fabricate an integrated circuit including circuitry described by the data structure. The circuitry described by the data structure includes a power management unit configured to receive a request from a processing core of the integrated circuit to enter an idle power state. The power management unit is configured to select one of a plurality of performance states based on the requested idle power state, and to cause the processing core to transition into the selected performance state prior to entering the requested idle power state.

DETAILED DESCRIPTION

Figure 1:
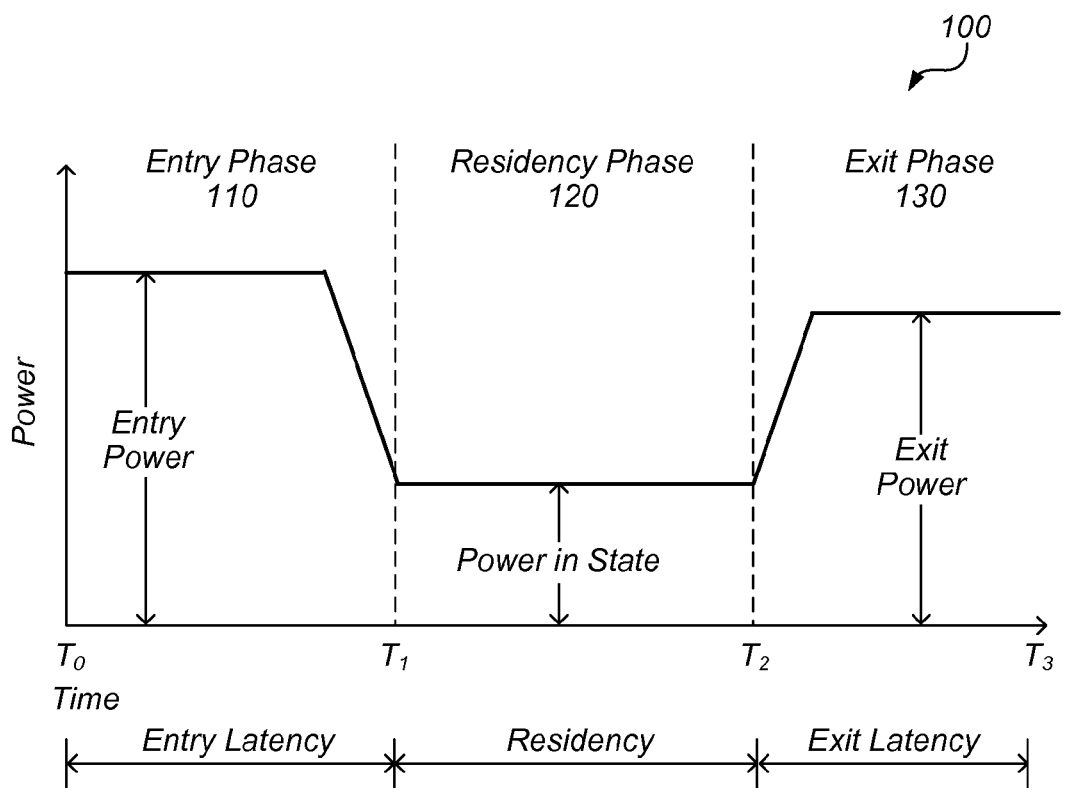
FIG. 1 is a graph illustrating an exemplary timing diagram of a processor upon entering and exiting an idle power state.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing cores, the terms "first" and "second" processing core can be used to refer to any two of the eight processing cores. In other words, the "first" and "second" processing cores are not limited to logical processing cores 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute instructions.

"Performance State." This term has its ordinary and accepted meaning in the art, and includes a state in which a processor (or core within a multi-core processor) is executing instructions at a particular voltage and/or a particular frequency. When processing demands are higher, hardware, software, or firmware may request that a processor operate at a higher performance state, which causes the processor to use a higher input voltage and a higher clock frequency. When processing demands are lower, a processor may operate at a lower performance state having a lower voltage and a lower frequency. The Advanced Configuration and Power Interface (ACPI) specification refers to performance states as "P-States." P0 is considered the highest P-State in which a processor uses its highest voltage and clock frequency and achieves its highest performance. Lower P-States corresponding to lesser performance are referred to as P1, P2, etc.

"Power state." This term has its ordinary and accepted meaning in the art, and includes a state indicative of the degree to which a processor is fully operational. Accordingly, a power state may include a state in which a processor is fully operational and executing instructions (referred to herein as an "operating power state") or one or more states in which a processor is not executing instructions and may be powered down in whole or in part (referred to herein as an "idle power state"). The ACPI specification refers to power states as "C-States." C0 is considered the highest power state in which a processor is fully operational. Lower power states include C1 in which a processor has halted from executing instructions, C2 in which a processor has stopped its clock but maintains visible state, C3 in which a processor has offloaded cache contents and stopped maintaining state, etc. Lower power states generally consume less power than higher power states once they have been entered. However, lower power states may take longer to enter/exit and may consume more power during such a transition.

Turning now to FIG. 1, a graph illustrating an exemplary timing diagram 100 of a processor upon entering and exiting an idle power state is depicted. As shown, a processor's power consumption may be divided into an entry phase 110, a residency phase 120, and an exit phase 130. A processor may begin entry phase 110 upon determining to enter an idle power state (e.g., one of C-states C1-C6) at a time $T_0$. During this phase 110, a processor may consume a significant amount of power in preparation for entering the idle power state. Power may be consumed, for example, to halt execution, offload contents of registers and caches to memory, stop the processor's clock, etc. A processor begins residency phase 120 upon entering the idle power state at $T_1$. In phase 120, the processor consumes less power as it is not executing instructions and portions of the processor may not be receiving power. A processor begins exit phase 130 upon detecting an event that necessitates exiting from the idle power state. At this point, the processor's power consumption may rise again upon as the processor prepares to return to an operating power state (e.g., C-state C0) at time $T_3$. During this phase 130, a processor may consume power to restore power to portions of the processor, reload registers and caches, start the processor's clock, etc. A processor's power total consumption during these three phases 110-130 can be approximated by the formula:

Entry Power×Entry Latency+Power in State×Residency+Exit Power×Exit Latency.

As a general rule, a processor consumes less power during phase 120 when it uses lower (i.e., deeper) idle power states (e.g., C-state Cn) than it does when it uses higher (i.e., shallower) idle power states (e.g., C-state Cn−1). For example, power state C3 (in which a processor has offloaded cache contents and stopped maintaining state) is a deeper idle power state than power state C1 (in which a processor has merely halted execution) and thus consumes less power in phase 120. The tradeoff is that the processor consumes more power during phases 110 and 130 when deeper idle power states are used and that those phases 110 and 130 last longer. Thus, for a particular idle power state to be practical, a processor needs to remain in the residency phase 120 long enough to justify the power consumed during the entry and exit phases 110 and 130.

A particular idle power state may also impractical (i.e., not suitable for use) based on the timing constraints of processes being performed by the processor (e.g., workloads sensitive to interrupt service time such as video playback, I/O Meter, 3DMark06, etc.). If the exit latency of a particular idle power state would prevent a processor from servicing a time-sensitive interrupt, a processor may not be able to use that idle power state. In some instances, this factor may be a lesser concern for systems/platforms that are able to tolerate higher interrupt service latency, for example, due to bigger buffering in the I/O domains.

Hardware, software, or firmware generally tries to select the idle power state that will produce the highest amount of power consumption while still satisfying the timing constraints of processes being performed by the processor. If certain idle power states cannot be justified given their respective power consumption or given particular timing constraints, the processor may prevent usage of those states, which are typically deeper idle power states.

The present disclosure describes techniques for managing power consumption and latencies for entry/exit of idle power states. Such techniques may permit a processor to use idle power states (e.g., deeper idle power states) that were previously impractical in some instances. Giving a processor a greater range of options allows the processor to potentially save more power. As will be described below, a processor may include one or more processing cores configured to operate in a different power states that includes an operating power state (e.g., C-state C0) and one or more idle power states (e.g., C-states C1-C6). In various embodiments, the processor includes a power management unit configured to receive a request from a processing core to enter an idle power state, and to select a performance state based on the requested idle power state. The processor is configured to cause the processing core to transition into the selected performance state prior to entering the requested idle power state. When the processing core later exits an idle power state, the power management unit may select another performance state to be used when the processor is exiting the idle power state.

By selecting particular performance states, the power management can manage power consumption and entry and exit latencies of a processing core when it enters and exits an idle power state. When higher performance states are selected, the entry and exit latencies may be reduced because a processor is operating at higher frequencies and performing operations needed to enter/exit an idle power state more quickly. When lower performance states are selected, a processor may consume less power when entering/exiting an idle power state. Thus, in various embodiments, if a particular idle power state is impractical because of its power consumption, the power management unit may select a particular performance to reduce the power consumption of the processor when entering/exiting that idle power state. If a particular idle power state is impractical because of its entry or exit latencies, the power management unit may select a particular performance to reduce those latencies. As noted above, managing of the entry and exit processes in this manner can increase the range of available idle power states for a processor and make the processor more energy efficient and robust.

Figure 2:
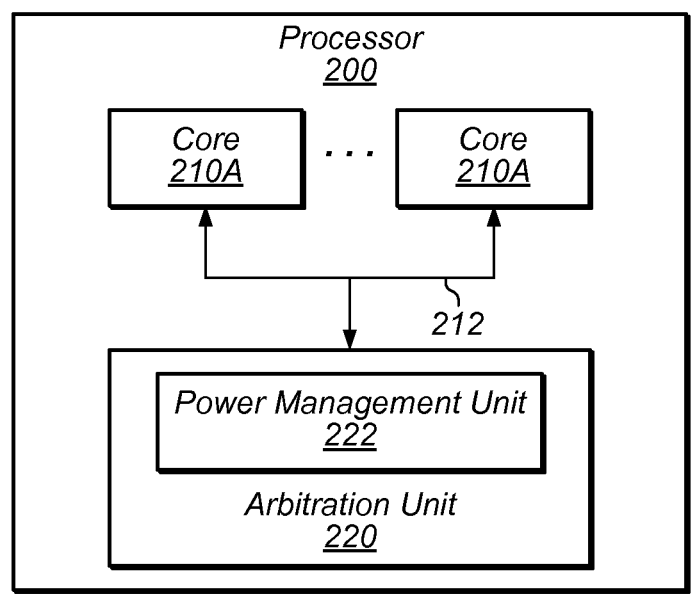
FIG. 2 is a block diagram illustrating one embodiment of a processor that includes a power management unit.

Turning now to FIG. 2, a block diagram of a processor 200 that includes a power management unit is depicted. Processor 200 is one embodiment of a processor that is configured to manage entry and exit of idle power states in the manner described above. As shown, processor 200 includes one or more cores 210A-B configured to operate in different performance states and different power states. Processor 200 also includes an arbitration unit 220 coupled to cores 210 via an interconnect 212. In the illustrated, arbitration unit 220 includes a power management unit 222. In other embodiments, power management unit 222 may be located elsewhere such as within one or more of cores 210, as a unit independent of arbitration unit 220, as a unit coupled to processor 200, etc.

Processor 200 may be any suitable type of processor that supports multiple performance states and multiple power states (such as those defined by the ACPI specification as P-states and C-states). Processor 200 may be a general-purpose processor such as a central processing unit (CPU). Processor 200 may be a special-purpose processor such as an accelerated processing unit (APU), digital signal processor (DSP), graphics processing unit (GPU), etc. Processor 200 may include acceleration logic such as an application-specific integrated circuit (ASIC), field-programmable gate array (FPGA), etc. Processor 200 may be a multi-threaded superscalar processor.

Arbitration unit 220, in one embodiment, is configured to facilitate sharing of common resources among cores 210. In one embodiment, arbitration unit 220 is a northbridge configured as a memory controller for interfacing with system memory such as random access memory (RAM). Arbitration unit 220 may facilitate communication with one or more auxiliary processors such as a graphics processor unit, encryption processor, etc. Arbitration unit 220 may interact with another arbitration unit (e.g., a southbridge), which may serve as an I/O controller, an interface with mass storage, etc.

Power management unit 222, in one embodiment, is configured to facilitate processor 200's usage of performance states and power states. In various embodiments, power management unit 222 is configured to cause a core 210 to transition into a new performance state or power state in response to receiving a request. In some embodiments, this request may be generated by an operating system or lower-level software executing on one or more cores 210, firmware, hardware (e.g., a power management controller separate from unit 222), etc. A request to change a core 210's performance state or its power state may be generated based on a processing demand, power consumption, temperatures of cores 210, etc. In one embodiment, when a decision is made to change a performance state or power state, a request is sent from a core 210 to power management unit 222 via interconnect 212. If the request is to change a core 210's power state, power management unit 222, in some embodiments, determines whether the requested power state is the most appropriate idle power state with respect to some predetermined criteria before granting the request such as being the best at reducing latency, being the best at reducing power consumption, does not violate timing constraints, etc. If the power management unit 222 determines that a better idle power state exists, power management unit 222 may service the request by causing a core 210 to transition into the better power state instead. In various embodiments, power management unit 222 may also cause a core 210 to transition to a deeper idle power state when the core is already in an idle power state (e.g., from C3 to C6).

In various embodiments, power management unit 222 is further configured to manage power consumption and entry/exit latency of cores 210 when they transition from an operating power state (e.g., C-state C0) to an idle power state (e.g., one of C-states C1-C6) or from an idle power state to an operating power state, by changing the performance states of cores 210 during theses transitions. In various embodiments, power management unit 222 selects a performance state based on the idle power state being entered/exited. In some embodiments, this selection is based on how much power a core 210 would consume when it uses that performance state to enter/exit the idle power state. For example, in one embodiment, power management unit 222 is configured to select the best performance state for minimizing power consumption during a transition. In some embodiments, this selection is based on how much time a core 210 would take when it uses that performance state to enter/exit the idle power state. For example, in one embodiment, power management unit 222 is configured to select the best performance state for minimizing latency during a transition. Power management unit 222 may also consider both power consumption and timing constraints when selecting a performance state, in one embodiment. In some embodiments, power management unit 222 may select different performance states for an idle power state depending upon whether that power state is being entered or being exited. Accordingly, in one embodiment, power management unit 222 selects higher performance states upon entering idle power states than upon exiting those idle power states—e.g., selecting P-state P1 for entering C-State C6 and P-state P2 for exiting C-State C6.

In some embodiments, power management unit 222 may select performance states differently depending upon whether a change of a "core power state" or a "package power state" is being requested. As used herein, the term "core power state" refers to a power state of a single core 210. For example, hardware, software, or firmware may request a change in a core power state by requesting that core 210A's power state be changed from C0 to C3 such that the change does not affect the power states of other cores. As used herein, the term "package power state" refers to a power state that is applicable to multiple cores. For example, a change in processor 200's package power state may be requested by requesting that all cores 210 transition from C0 to C3. Power-state changes may be handled differently depending up on whether they are core-power-state changes or package-power-state changes. For example, core 210A and 210B may share common components such as a cache. If a core-power-state change is made that causes core 210A to transition to an idle power state while core 210B is in an operating power state, processor 200 may not disable their common cache because it is still in use by core 210B. On the other hand, if a package-power-state change is made, processor 200 may disable the cache. In one embodiment, power management unit 222 may select performance states only for core-power-state transitions and not for package-power-state transitions. In another embodiment, power management unit 222 may select different performance states for core-power-state transitions than it does for package-power-state transitions. For example, if a core power state transition is being performed for core 210A, power management unit may select a performance state that improves latency. However, if a package power state transition is being performed for both cores 210A and 210B, power management unit 222 may select a different performance state for core 210A to minimize power consumption while selecting a performance state for core 210B to minimize latency. It is noted that such a selection may also be applicable to heterogeneous cores as well as compute units.

After a core 210 has returned to an operating power state, power management unit 222, in various embodiments, is further configured to coordinate the core 210's return to its initial performance state (i.e., the one that it was using prior to entering any idle power state). In one embodiment, if the selected performance state used upon exiting an idle power state is lower than the initial performance state (e.g., P-state P2 versus an initial P-state of P1, respectively), power management unit 222 may decide to wait for a specified period before permitting the core 210 to transition back into its initial performance state. In some embodiments, power management unit 222 may support a high-performance mode in which a transition is permitted to occur immediately and a power saving mode, in which a core 210 is forced remain in the exit performance state until timer has expired. If, upon timer expiration, a core 210 is still in an operating power state, power management unit 222 may restore a core 210 to its initial performance state because the core 210 is likely performing a longer task—this restoration ensures that execution occurs at a proper performance level. On the other hand, if the core 210 completes the task before expiration of the timer, power management unit 222 may cause the core 210 to again enter an idle power state without returning to its initial performance state. In one embodiment, the timer value is tuned to reflect relatively short tasks such as an idle handler, which does not require a full processor execution capability and allows for saving power by staying in a performance state that consumes less power.

Figure 3:
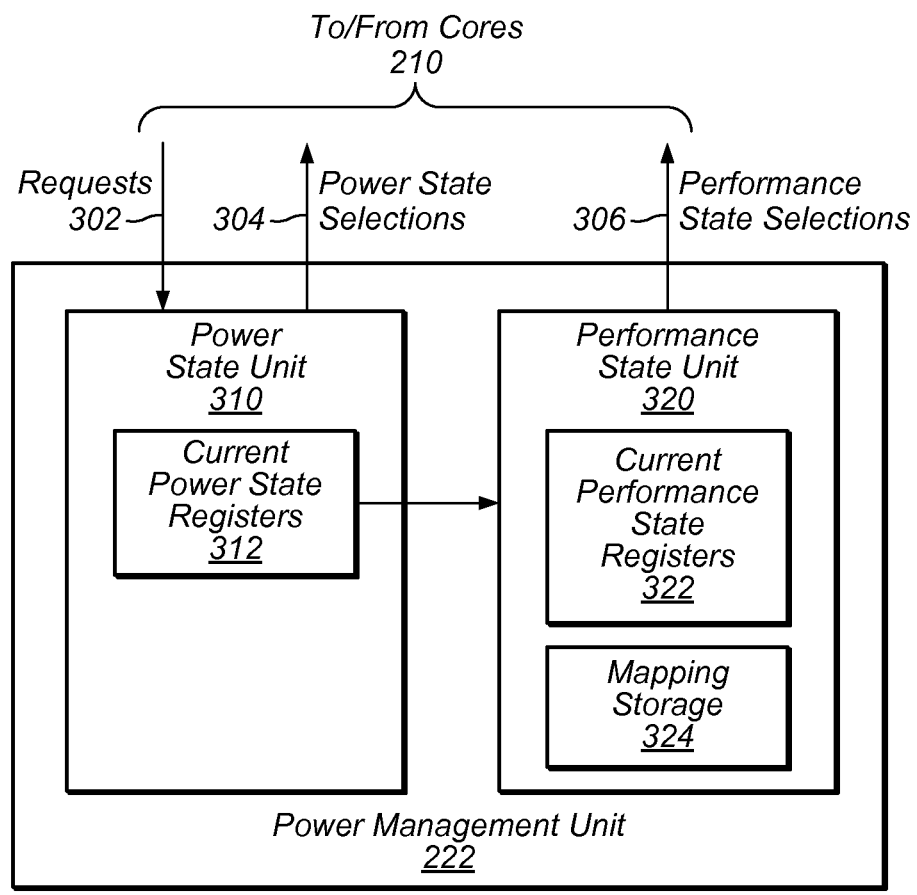
FIG. 3 is a block diagram illustrating one embodiment of the power management unit.

Turning now to FIG. 3, one embodiment of power management unit 222 is depicted. In the illustrated embodiment, power management unit 222 includes power state unit 310 and performance state unit 320. Power state unit 310 includes current power state registers 312. Performance state unit 320 includes current performance state registers 322 and mapping storage 324.

Power state unit 310, in one embodiment, is configured to coordinate the changing of power states for processor 200. In the illustrated embodiment, power state unit 310 receives requests 302 from cores 210 to change power states of those cores. In one embodiment, a given request 302 may identify the desired power state and further identify the core or cores 210 for which the request is applicable. Power state unit 310 may cause a core 210 to transition into the requested power state by indicating a power state selection 304. In some embodiments, power state unit 310 may, alternatively, select a new power state and cause the core 210 to transition into the non-requested power state via a selection 304. In one embodiment, power state unit 310 may record power state changes in registers 312, which record the current power states of each core 210. In some embodiments, registers 312 may be visible to hardware, software, or firmware executing on processor 200. In one embodiment, a request 302 may be made by attempting to write to a register 312. In the illustrated embodiment, registers are also accessible to performance state unit 320.

Performance state unit 320, in one embodiment, is configured to coordinate the changing of performance states for processor 200. In various embodiments, performance state unit 320 may change core 210's performance state in response to receiving a request (not shown) from a core 210. In some embodiments, performances state unit 320 may also change a core 210's performance state when power state unit 310 determines to cause a core 210 to enter an idle power state from an operating power state or exit an idle power state to an operating power state (as discussed above). In the illustrated embodiment, performance state unit 320 selects a performance state for use during such a transition based on a mapping stored in storage 324.

Mapping storage 324, in one embodiment, is configured to store a mapping of power states and performance. In various embodiments, the mapping specifies a performance state to be used upon entering an idle power state from an operating power state (i.e., an "entry performance state") and a performance state to be used upon exiting an idle power state to an operating power state (i.e., an "exit performance state"). One example of a possible mapping is presented below:

| Idle Power State | Entry Performance State | Exit Performance State | Valid Bit |
|---|---|---|---|
| C1 (shallowest state) | NA | NA | 1 |
| C2 | NA | NA | 1 |
| C3 | NA | P4 | 1 |
| C4 | NA | P4 | 1 |
| C5 | P1 | P4 | 1 |
| C6 (deepest state) | P1 | P2 | 1 |

In this example, each idle power state has an entry-performance-state value and an exit-performance-state value. These values may identify a particular performance state (e.g., P1 for C6's entry performance state) or specify an indication of "NA" for non-applicable. In some embodiments, a value may specify non-applicable for an idle power state if no performance-state transition is needed because that power state is energy efficient and its entry/exit latency is below a predetermined limit, regardless of the current performance state. As shown, the exemplary mapping also includes a valid bit for each idle power state. In some embodiments, power management unit 222 may disable an idle power state (e.g., by clearing its value bit) if no performance state can be found that addresses power efficiency and/or latency requirements. In various embodiments, power state unit 310 may be prevented from selecting disabled power states for cores 210.

In some embodiments, power management unit 222 is configured to update the mapping stored in storage 324 (as opposed to a static mapping, e.g., set during fabrication). In one embodiment, power management unit 222 may update the mapping by exposing the mapping to software and allowing it to change values in the mapping. In some embodiments, power management unit 222 may be configured to automatically update the mapping as particular power and/or timing constraint change. For example, in one embodiment, power management unit 222 may support a performance mode and a power-saving mode. Power management unit 222 may be configured to recalculate the mapping in store 324 depending upon the selected mode.

Various methods for selecting performances states based on idle power states are described next in conjunction with FIGS. 4-6.

Figure 4:
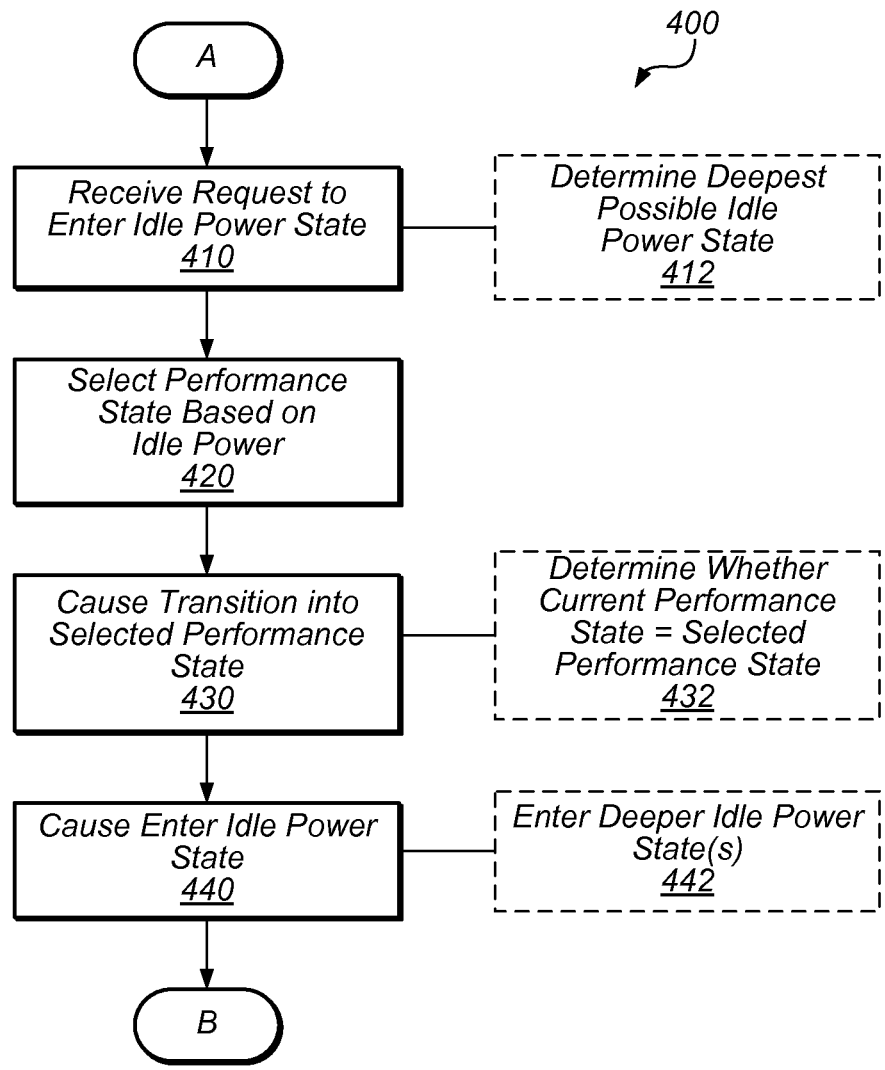
FIG. 4 is a flow diagram illustrating one embodiment of a method for entering an idle power state.

Turning now to FIG. 4, a flow diagram of a method 400 for entering an idle power state is depicted. Method 400 is one embodiment of a method that may be performed by a processor that includes a power management unit such as processor 200. In the illustrated embodiment, method 400 includes steps 410, 420, 430, and 440. In some embodiments, method 400 may also include steps 412, 432, and 442 (as indicated with a dotted line). In many instances, performance of method 400 can reduce latency and/or power consumption when entering an idle power state.

In step 410, processor 200 (e.g., using power management unit 222) receives a request to cause a processing core (e.g., core 210) enter an idle power state. As discussed above, in various embodiments, the request may be generated by hardware, software, or firmware and sent from a processing core to a power management unit, which, in some embodiments, may be located within a northbridge (e.g., arbitration unit 220). The request may identify one or more processing cores and specify a desired power state. In some embodiments, the specified power state may be defined by the ACPI specification and may be a core power state or a package power state. In some embodiments, the power management unit may further determine, in step 412, the deepest possible idle power state that may be entered. If the requested power state is not the deepest available state, the power management unit may choose to, instead, use the deepest possible idle power state in subsequent steps.

In step 420, processor 200 selects performance state based on the idle power state to be entered. As discussed above, the performance state may be selected based on 1) an amount of power consumed by the processor (or processing core) to enter the idle power state while operating at the selected performance state and/or 2) an amount of time needed to enter the requested idle power state while operating at the selected performance state. In some embodiments, the performance state may be selected using a stored mapping of power states to performance states (e.g., in storage 324). In one embodiment, processor 200 may determine a new mapping of power states to performance states based on one or more criteria and update the stored mapping with the new mapping.

In step 430, processor 200 causes a processing core to transition into the selected performance state prior to entering the idle power. In various embodiments, step 430 may include changing the voltage supplied to the processing core and the processing core's clock frequency to those of the selected performance state.

In step 440, processor 200 causes the processing core to enter the idle power state with the selected performance state. In various embodiments, step 440 may include halting execution of the core, offload contents of the core's registers and caches to memory, stopping the core's clock, disconnecting power, etc. In some instances, processor 200 may subsequently cause the processing core enter deeper idle power states based on changing processing demands and/or power considerations.

Processor 200 may then perform method 500 upon determining to return to an operating power state as described next.

Figure 5:
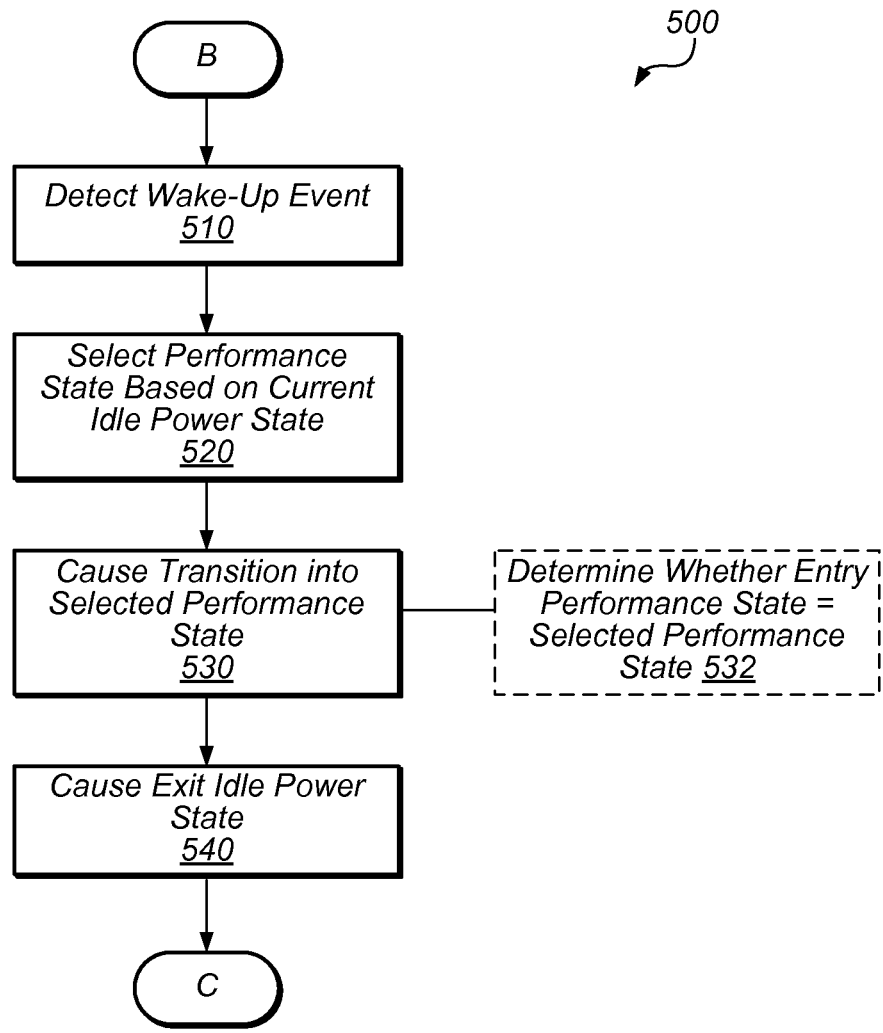
FIG. 5 is a flow diagram illustrating one embodiment of a method for exiting an idle power state.

Turning now to FIG. 5, a flow diagram of a method 500 for exiting an idle power state is depicted. Method 500 is another embodiment of a method that may be performed by a processor that includes a power management unit such as processor 200. In the illustrated embodiment, method 500 includes steps 510, 520, 530, and 540. In some embodiments, method 500 may also include step 532 (as indicated with a dotted line). In many instances, performance of method 500 can reduce latency and/or power consumption when exiting an idle power state.

In step 510, processor 200 detects a wake-up event that necessitates causing a core to exit its idle power state and return to an operating power state. In some instances, this event may correspond to receiving a request to service an interrupt, receiving a request from, for example, an operating system running on other cores to help with an increase in processing demand, etc.

In step 520, processor 200 selects a performance state based on the current idle power state of a core or cores. In some instances, the current idle power state may be the idle power state entered in step 440; in other instances, the current idle power state may be a deeper power state that was subsequently entered. As discussed above, the performance state may be selected based on 1) an amount of power consumed by the processor (or processing core) to exit the idle power state while operating at the selected performance state and/or 2) an amount of time needed to exit the requested idle power state while operating at the selected performance state. In some embodiments, if a processing core is exiting the same idle power state that it entered in step 440, the performance state selected in step 520 may be a lower performance state (e.g., P-state P2) than the performance state selected in step 420 (e.g., P-state P1).

In step 530, processor 200 causes a core to transition into the selected performance state. In various embodiments, step 530 may include resupplying power and a clock signal, which have a voltage and clock frequency of the selected performance state, to the core. In various embodiments, step 530 may be performed as an initial part of step 540.

In step 540, processor 200 causes a core to exit the idle power state and return to an operating power state. In various embodiments, step 540 may include reconnecting power, restarting the core's clock, reloading contents of the core's registers and caches to memory, resuming execution, etc. In some embodiments, processor 200 may perform method 600 described next upon completed step 540.

Figure 6:
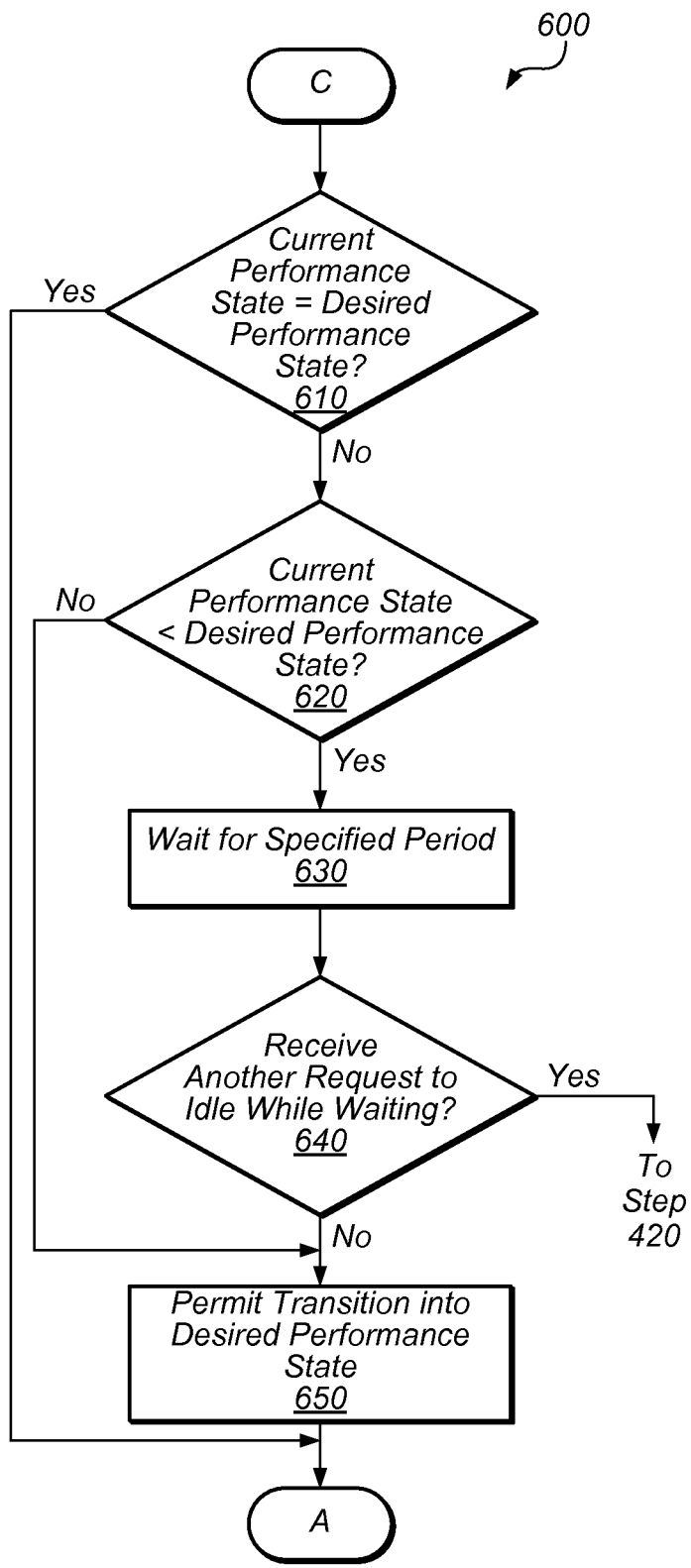
FIG. 6 is a flow diagram illustrating one embodiment of a method for transitioning to a desired performance state upon exiting an idle power state.

Turning now to FIG. 6, a flow diagram of a method 600 for transitioning to a desired performance state upon exiting an idle power state is depicted. Method 600 is another embodiment of a method that may be performed by a processor that includes a power management unit such as processor 200.

In step 610, processor 200 determines whether the current performance state of a core (e.g., the performance state selected in step 520) is equal to a desired performance state for the core (e.g., the initial performance state of the core before it entered an idle power state). If these two are equal, the processing core is operating at the desired performance state. At this point, processor 200, in one embodiment, may return to the beginning of method 400 and wait for a request to cause the core to enter an idle power state. Otherwise, method proceeds to step 620.

In step 620, processor 200 further determines whether the current performance is less than the desired performance state. If the desired performance state is greater than the current performance state, method 600 proceeds to step 630, where processor 200 begins waiting for a specified period. Otherwise, method proceeds to step 650.

In step 630, processor 200 starts a timer and waits for a specified period of time. As discussed above, in one embodiment, the specified period of time may be tuned to reflect relatively short tasks such as an idle handler, which does not require a full processor execution capability and allows for saving power by staying in a performance state that consumes less power.

In step 640, processor 200 determines whether it has received another request to cause the core to return to an idle power state while waiting for the specified period. In the illustrated embodiment, if processor 200 receives such a request, processor 200 returns to step 420 in method 400. If no request is received during the waiting period, method 600 proceeds to step 650.

In step 650, processor 200 permits the core to transition into the desired performance state. In some embodiments, processor 200 may return to the start of method 400 after completion of step 650.

Exemplary Computer System

Figure 7:
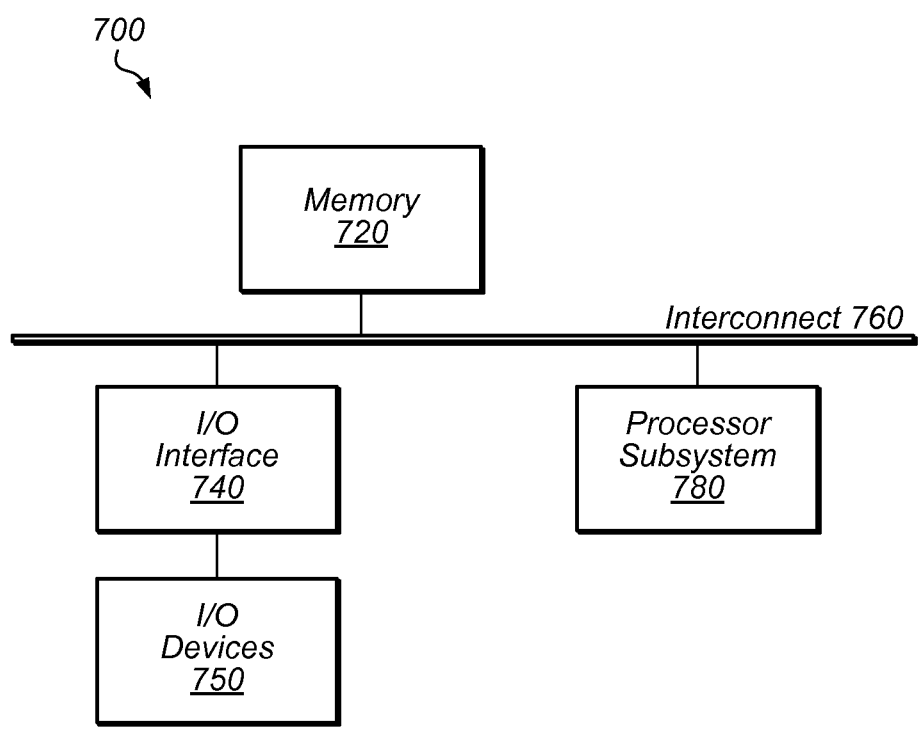
FIG. 7 is a block diagram illustrating one embodiment of an exemplary computer system.

Turning now to FIG. 7, one embodiment of an exemplary computer system 700, which may include processor 200, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 700 may also be any type of networked peripheral device such as storage devices, switches, modems, routers, etc. Although a single computer system 700 is shown for convenience, system 700 may also be implemented as two or more computer systems operating together.

Processor subsystem 780 may include one or more processors or processing units. For example, processor subsystem 780 may include one or more processing units (each of which may have multiple processing elements or cores) that are coupled to one or more resource control processing elements 720. In various embodiments of computer system 700, multiple instances of processor subsystem 780 may be coupled to interconnect 760. In various embodiments, processor subsystem 780 (or each processor unit or processing element within 780) may contain a cache or other form of on-board memory. In one embodiment, processor subsystem 780 may include processor 200 described above.

System memory 720 is usable by processor subsystem 780. System memory 720 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more backside buses. I/O interfaces 740 may be coupled to one or more I/O devices 750 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device.

Program instructions that are executed by computer systems (e.g., computer system 700) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, a computer-readable storage medium can be used to store instructions read by a program and used, directly or indirectly, to fabricate hardware for processor 200 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 200. The netlist may then be placed and routed to produce a data set describing geometric shapes to be applied to masks. The masks may then be used in various semiconductor fabrication steps to produce a semiconductor circuit or circuits corresponding to processor 200.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a processing core configured to operate in a plurality of power states that includes an operating power state and at least one idle power state, and wherein the processing core is configured to operate in a plurality of performance states; and
a power management unit configured to receive a request from the processing core to enter the at least one idle power state, wherein the power management unit is configured to select a first of the plurality of performance states based on an amount of time needed to enter the requested idle power state while operating at the first performance state;
wherein the apparatus is configured to cause, in response to the request, the processing core to transition into the selected first performance state prior to entering the requested idle power state.

2. The apparatus of claim 1, wherein the power management unit is configured to select the first performance state based on an amount of power consumed by the processing core to enter the requested idle power state while operating at the first performance state.

3. The apparatus of claim 1, wherein the power management unit is configured to select a second of the plurality of performance states based on the requested idle power state; and
wherein the apparatus is configured to cause the processing core to transition into the selected second performance state as the processing core exits the requested idle power state.

4. The apparatus of claim 3, wherein the apparatus is configured to wait for a specified amount of time after exiting the requested idle power state before permitting the processing core to transition from the selected second performance state.

5. The apparatus of claim 1, wherein the processing core is configured to enter the requested idle power state and to subsequently transition into a deeper idle power state;
wherein the power management unit is configured to select a second of the plurality of performance states based on the deeper idle power state; and
wherein the apparatus is configured to cause the processing core to transition into the selected second performance state as the processing core exits the deeper idle power state.

6. The apparatus of claim 1, wherein the power management unit is configured to store a mapping of power states to performance states, and wherein the power management unit is configured to use the stored mapping to select the first performance state.

7. The apparatus of claim 6, wherein the apparatus is configured to determining a new mapping of power states to performance states based on one or more criteria, and wherein the apparatus is configured to update the stored mapping with the new mapping.

8. The apparatus of claim 1, further comprising:
a northbridge configured to perform memory operations with a memory coupled to the apparatus; and
wherein the power management unit is located within the northbridge.

9. The apparatus of claim 1, wherein the plurality of power states include C-states defined by the Advanced Configuration and Power Interface (ACPI) specification, and wherein the plurality of performance states include P-states defined by the ACPI specification.

10. A method, comprising:
a processor operating a processing core at a first performance state when the processing core enters an idle power state;
the processor selecting a second performance state for the processing core while in the idle power state, wherein the processor selects the second performance state based on an amount of time needed to exit the idle power state while operating at the second performance state; and
the processor operating the processing core at the second performance state when the processing core exits the idle power state.

11. The method of claim 10, wherein the process core uses a higher clock frequency when operating at the first performance state than when operating at the second performance state.

12. The method of claim 10, further comprising:
the processor determining to operate the processing core at the first performance state in response to receiving a request to cause the processing core to enter the idle power state.

13. The method of claim 12, wherein the processor includes a plurality of processing cores, and wherein the request is to change a package power state of the plurality of processing cores.

14. The method of claim 10, wherein the processor stores a mapping of performance states and power states, and wherein the processor uses the mapping to select the second performance state.

15. The method of claim 10, wherein the processor selects the second performance state based on an amount of power consumed by the processing core to exit the idle power state while operating at the second performance state.

16. The method of claim 10, further comprising:
the processor waiting for a specified amount of time after the processing core exits the idle power state before permitting the processing core to transition from the second performance state to a third performance state.

17. A non-transitory computer readable storage medium comprising a data structure which is operated upon by a program executable on a computer system, the program operating on the data structure to perform a portion of a process to fabricate an integrated circuit including circuitry described by the data structure, the circuitry described by the data structure including:
a power management unit configured to:
receive a request from a processing core of the integrated circuit to enter an idle power state;
select one of a plurality of performance states based on an amount of time needed to enter the requested idle power state while operating at the performance state; and
cause the processing core to transition into the selected performance state prior to entering the requested idle power state.

18. The computer readable storage medium of claim 17, wherein the storage medium stores hardware description language (HDL) data, Verilog data, or graphic database system II (GDSII) data.

* * * * *